US006695380B1

(12) United States Patent
Hicks

(10) Patent No.: US 6,695,380 B1
(45) Date of Patent: Feb. 24, 2004

(54) VEHICULAR FLOOR PANEL

(75) Inventor: Thomas S. Hicks, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,318

(22) Filed: Jan. 8, 2003

(51) Int. Cl.$^7$ .............................................. B62D 25/20
(52) U.S. Cl. ................ 296/97.23; 296/37.3; 296/37.14; 410/97
(58) Field of Search ............................. 296/97.23, 37.6, 296/100.02, 37.8, 37.14; 52/403.1, 480, 263, 126.6, 351; 224/542, 539; 410/100, 118, 97

(56) References Cited

U.S. PATENT DOCUMENTS

| | | | | |
|---|---|---|---|---|
| 3,450,429 A | * | 6/1969 | Stata ........................ 296/97.23 |
| 3,669,817 A | * | 6/1972 | McDevitt .................. 296/97.23 |
| 3,877,671 A | * | 4/1975 | Underwood et al. .......... 410/97 |
| 4,305,695 A | | 12/1981 | Zachrich |
| 4,877,281 A | | 10/1989 | Altmann |
| 5,022,537 A | | 6/1991 | Henriquez |
| 5,050,926 A | * | 9/1991 | Tanaka ....................... 296/37.3 |
| 5,061,002 A | * | 10/1991 | Saso .......................... 296/37.3 |
| 5,080,417 A | * | 1/1992 | Kanai ......................... 296/37.3 |
| 5,178,434 A | * | 1/1993 | Krebs ....................... 296/97.23 |
| 5,257,846 A | * | 11/1993 | Kanai et al. ................ 296/37.14 |
| 5,482,759 A | * | 1/1996 | Primeau ...................... 428/167 |
| 5,524,317 A | * | 6/1996 | Nagahama et al. ............ 52/177 |
| 5,827,022 A | * | 10/1998 | Tovani ....................... 410/104 |
| 5,836,637 A | * | 11/1998 | Laginess et al. ......... 296/37.14 |
| 5,931,632 A | | 8/1999 | Dongilli et al. |
| 6,062,452 A | | 5/2000 | Kauskey |
| 6,186,379 B1 | * | 2/2001 | Haage et al. ............. 296/97.23 |
| 6,247,741 B1 | * | 6/2001 | Seel et al. .................. 296/37.3 |
| 6,253,943 B1 | * | 7/2001 | Spykerman et al. ........ 224/539 |
| 6,308,873 B1 | * | 10/2001 | Baldas et al. ............... 224/539 |
| 6,328,364 B1 | | 12/2001 | Darbishire |
| 6,338,518 B1 | * | 1/2002 | D'Annunzio et al. ...... 296/37.8 |
| 6,409,136 B1 | * | 6/2002 | Weiss et al. .............. 296/37.14 |
| 6,439,633 B2 | * | 8/2002 | Nemoto ...................... 296/37.3 |
| 6,439,815 B1 | * | 8/2002 | Liu ............................. 410/97 |
| 6,461,090 B1 | * | 10/2002 | Faber et al. .................. 410/97 |
| 6,467,829 B2 | * | 10/2002 | Kaluszka et al. .......... 296/37.3 |
| 6,502,886 B1 | * | 1/2003 | Bleau et al. ............... 296/37.3 |
| 6,524,040 B1 | * | 2/2003 | Heil .......................... 410/100 |
| 2003/0057724 A1 | * | 3/2003 | Inagaki et al. ........... 296/37.14 |

* cited by examiner

Primary Examiner—Kiran Patel
(74) Attorney, Agent, or Firm—Lear Corporation

(57) ABSTRACT

A vehicular floor panel (20) for attachment to a floor pan (16) of an automotive vehicle (12) is provided. The floor panel (20) is a reversible floorboard having a first surface (22) and a second surface (24) that is opposite to the first surface (22). This first surface (22) has a fabric covering (26) attached thereon. Additionally, the second surface (24) has at least one mounting device (28, 34, 36) integrated thereon for securing an item to the floor panel (20). The floor panel (20) also includes at least one fastener (54, 60) for selectively coupling the panel (20) to the floor pan (16) of the automotive vehicle (12) thereby permitting access to either the first surface (22) or the second surface (24) of the floor panel (20).

8 Claims, 17 Drawing Sheets

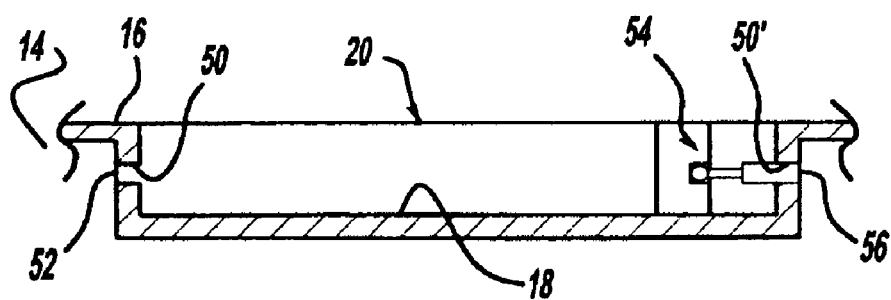

VEHICULAR FLOOR PANEL

BACKGROUND OF INVENTION

The present invention relates generally to floor pans of automotive vehicles, and more particularly to a vehicular floor panel for selectively securing a variety of objects to the vehicle and for also providing an aesthetically pleasing appearance.

Automotive manufacturers are well known for producing vehicles with carpeted flooring in the passenger cabins and the cargo areas of the vehicles. Typically, this carpeted flooring is beneficial because it provides an aesthetically pleasing appearance for the occupants of the vehicle. Moreover, the carpeted flooring in the cargo areas can include mounting devices for securing various types of cargo to the vehicle.

A drawback of typical carpeted flooring is that it is comprised of a fabric that is not sufficiently durable for resisting wear and damage. In particular, the carpeted flooring of the cargo areas can experience substantial wear and damage as a result of having cargo frequently placed in those areas of the vehicle.

A proposed solution requires that a protective mat or covering is placed over the carpeted flooring. The protective mat is intended to reduce or distribute the amount of force applied to the carpeted flooring. However, the cargo can still sandwich the carpeting between the protective mat and the floor pan. As a result, the fabric of the carpeting can still be subjected to a substantial amount of loading from the cargo. In this regard, the carpeted flooring can still be subject to wear or damage.

Therefore, it would be desirable to provide a vehicular floor panel that selectively resists wear and damage yet also provides an aesthetically pleasing appearance when desired.

SUMMARY OF INVENTION

The present invention provides a vehicular floor panel for attachment to a floor pan of an automotive vehicle. The floor panel is a reversible floorboard having a first surface and a second surface that is opposite to the first surface. This first surface has a fabric covering attached thereon. Additionally, the second surface has at least one mounting device integrated thereon for securing an item to the floor panel. The floor panel also includes at least one fastener for selectively coupling the panel to the floor pan of the automotive vehicle thereby permitting access to either the first surface or the second surface of the floor panel.

One advantage of the present invention is that a vehicular floor panel is provided that includes a first surface with a fabric attached thereon, which has an aesthetically pleasing appearance to the occupants of the vehicle.

Another advantage of the present invention is that a vehicular floor panel is provided that has a second surface with at least one mounting device integrated thereon for allowing a variety of items to be secured to the vehicle.

Other advantages of the present invention will become apparent when viewed in light of the detailed description of the preferred embodiment when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention:

FIG. 12C is a cross-sectional view of the vehicular floor panel shown in FIG. 12B, illustrating the cam latch mechanisms securing the vehicular floor panel to the floor pan;

DETAILED DESCRIPTION

Figure 1:
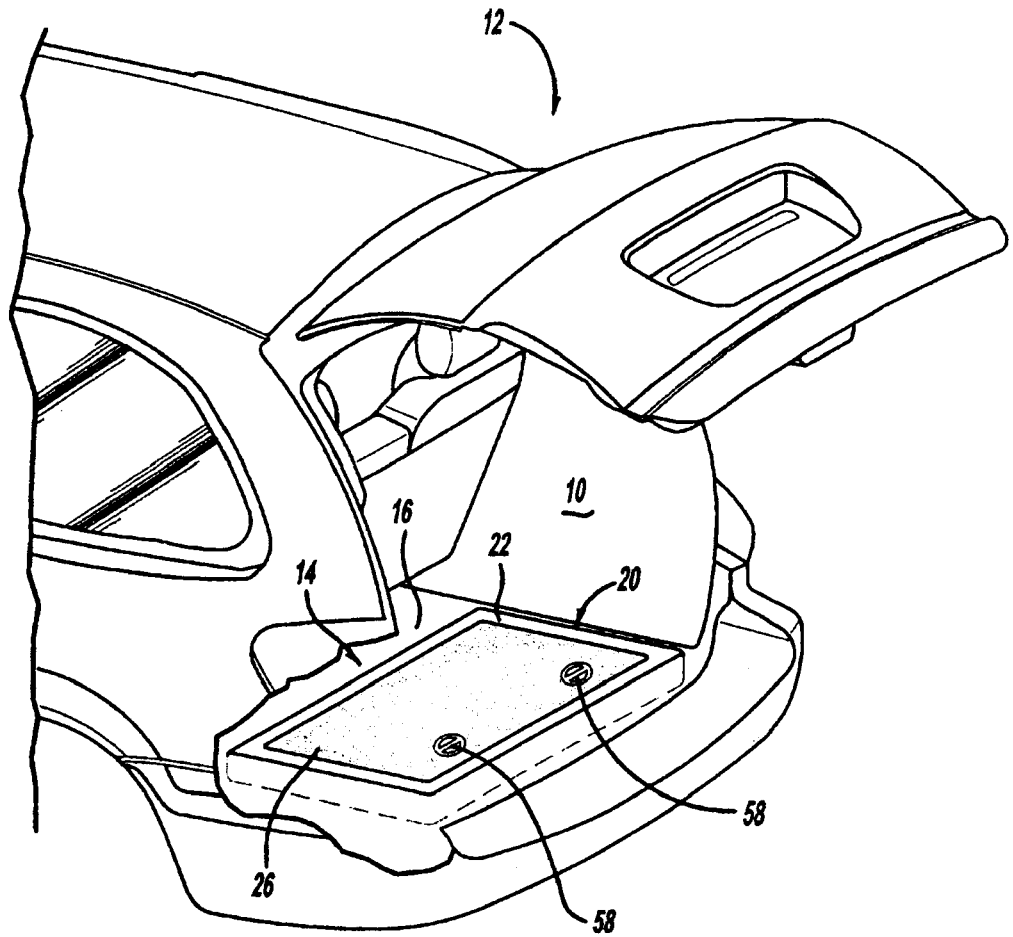
FIG. 1 is a perspective view of a cargo area of a vehicle having a flooring assembly, in accordance with one embodiment of the present invention.

In the following figures, the same reference numerals are used to identify the same components in the various views. The present invention is particularly suited for a cargo area of a vehicle. However, it is understood that the present invention may suited for various other sections of the vehicle as desired.

Referring to FIG. 1, there is shown a cargo area 10 of a vehicle 12 according to one embodiment of the invention. This cargo area 10 can be utilized for transporting a variety of items.

Figure 2:
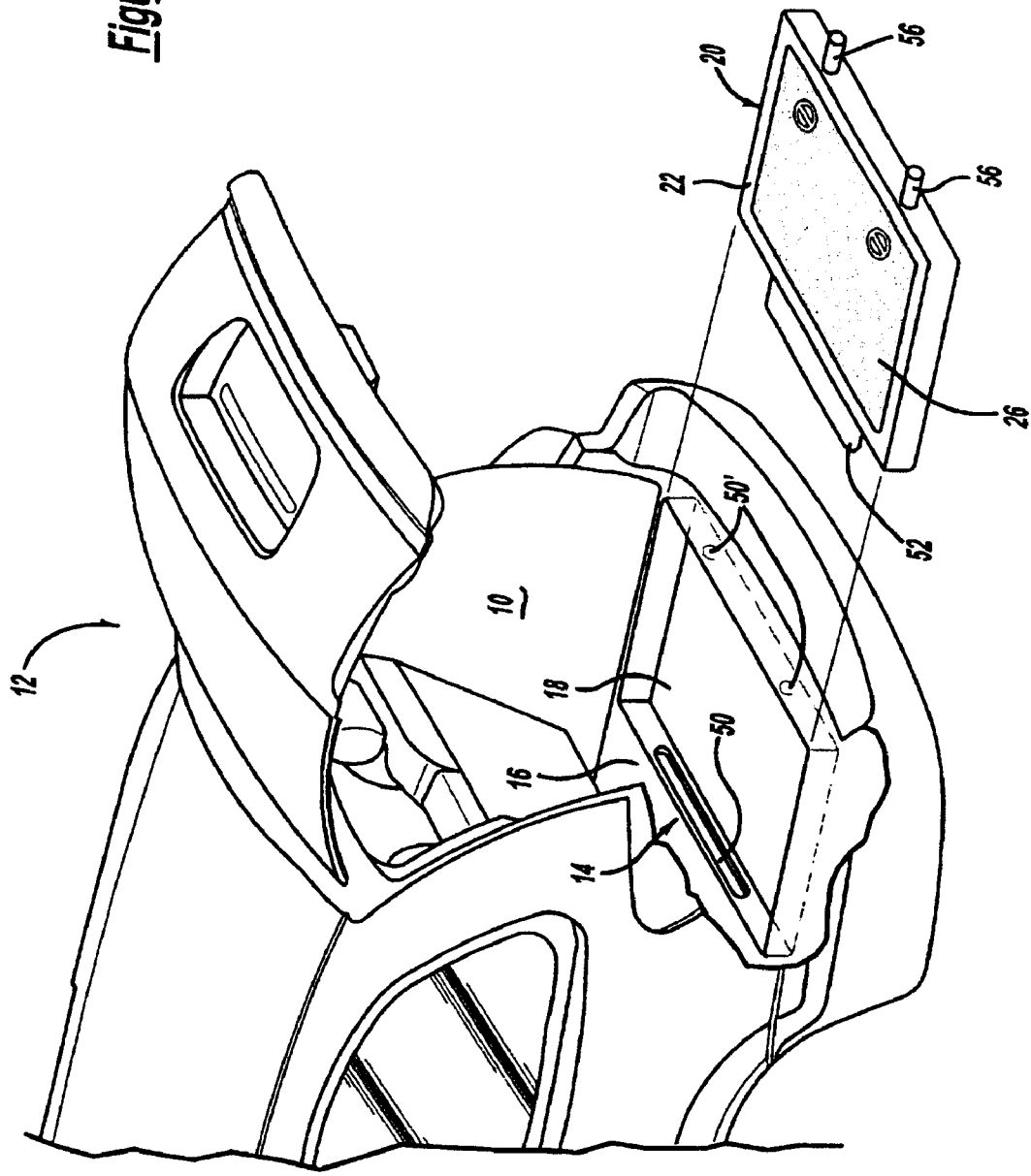
FIG. 2 is an exploded view of the flooring assembly shown in FIG. 1.

As best shown in FIG. 2, the cargo area 10 includes a flooring assembly 14 that is intended to selectively allow items to be secured to the vehicle 12 and to provide an aesthetically pleasing appearance when desired.

The flooring assembly 14 includes a floor pan 16, which is an integral component of the vehicle 12. This floor pan 16 has a recess 18 integrally formed therein for receiving a vehicular floor panel 20.

Figure 3:
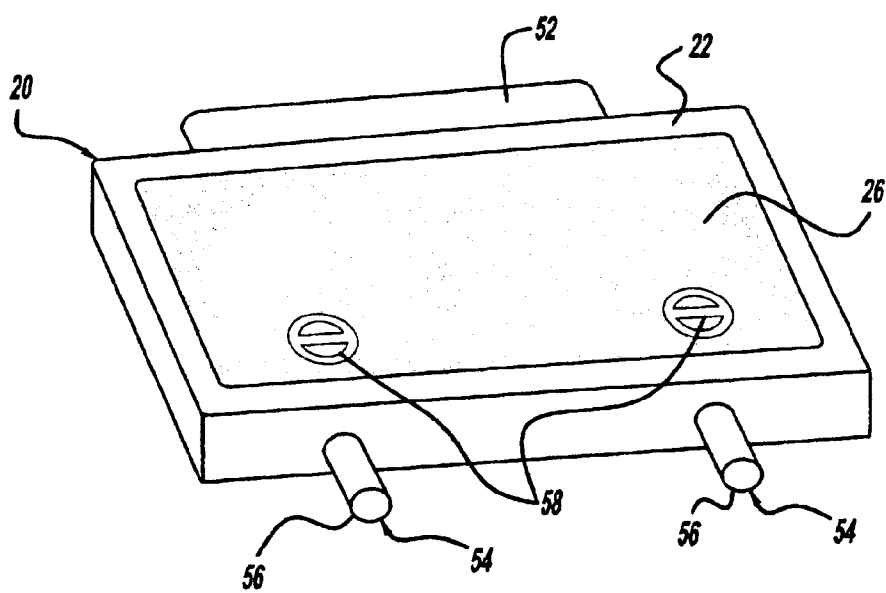
FIG. 3 is a perspective view of a first surface of the vehicular floor panel shown in FIG. 1.
Figure 4:
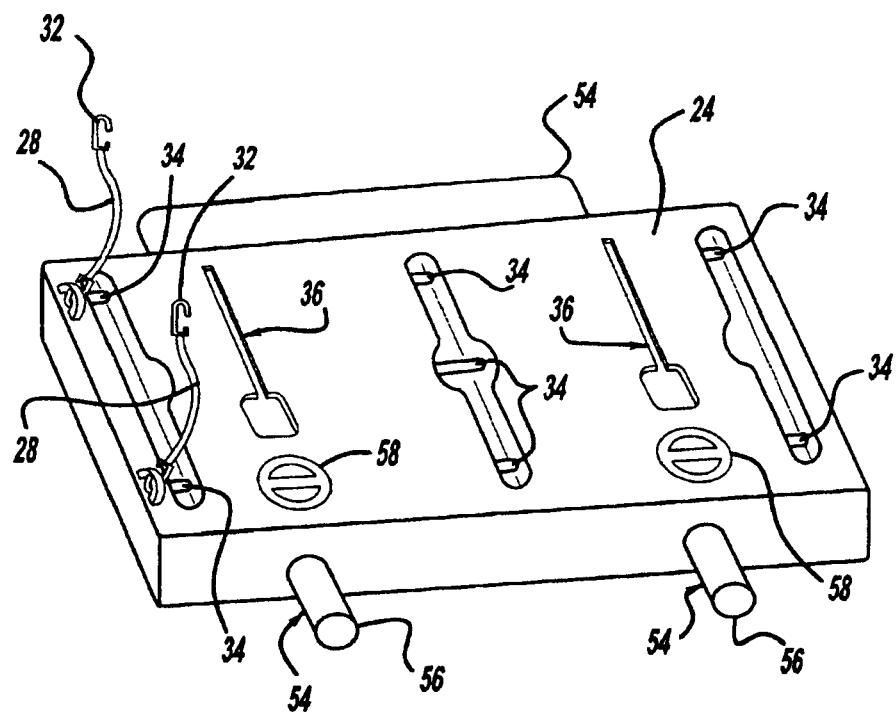
FIG. 4 is a perspective view of a second surface of the vehicular floor panel shown in FIG. 1.

Referring now to FIGS. 3 and 4, the vehicular floor panel 20 is a reversible floorboard that has a first surface 22 (as shown in FIG. 3) and a second surface 24 (as shown in FIG. 4). The floor panel 20 may be selectively secured to the floor pan 16 so as to expose either the first surface 22 or the second surface 24 to the passenger cabin. The attachment of the vehicular floor panel 20 to the floor pan 16 is detailed in the description for FIGS. 12A–13C.

The first surface 22 of the floor panel 20 has a fabric 26 attached thereon for providing a visually attractive appearance to occupants of the vehicle 12 when the first surface 22 is exposed to the passenger cabin. This fabric 26 preferably is a continuous piece of carpeting. However, it is understood that the first surface 22 may instead include various other materials that are cosmetically appealing.

The second surface 24 of the floor panel 20 includes one or more mounting devices and is intended to permit various items to be secured to the vehicle 12 when the second surface 24 is exposed to the passenger cabin. In this regard, the second surface 24 is comprised of a fixed durable plastic material that can resist wear and damage. However, it is understood that the second surface 24 can be comprised of various other suitable materials as desired.

Figure 5:
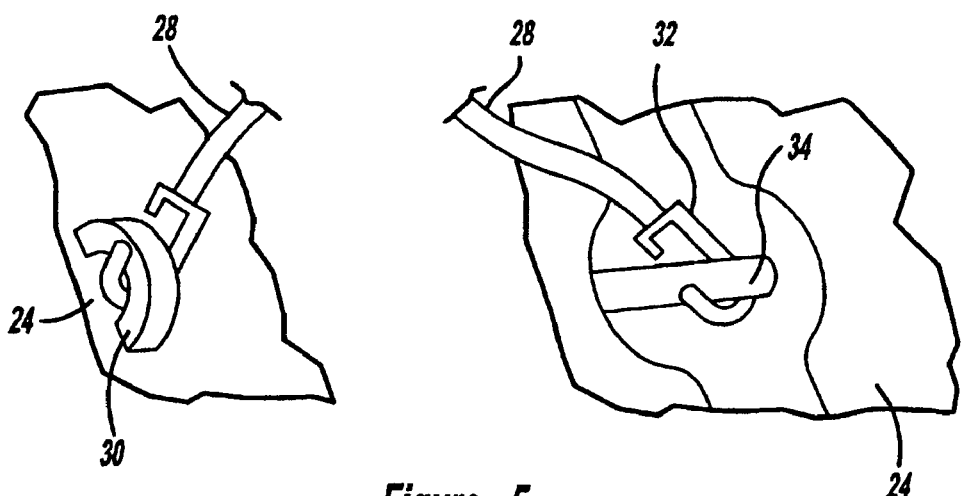
FIG. 5 is a perspective view of an exemplary mounting device for securing an item to the second surface of a second surface of the vehicular floor panel shown in FIG. 4.

Referring now primarily to FIG. 5, these mounting devices include one or more stretchable cords 28 integrated within and extending from the second surface 24 of the vehicular floor panel 20. Each cord 28 is intended to wrap and stretch around an item in order to secure that item to the vehicular floor panel 20.

In one embodiment, the second surface 24 includes one or more attachment loops 30 integrally formed therein for allowing the cords 28 to be tied thereto. These attachment loops 30 are integral parts of one end of the floor panel 20. However, it is understood that a separate loop member or ring member may be in-mold mounted or otherwise fixedly attached to the second surface 24. Moreover, these cords 28 may be attached to other suitable portions of the second surface 24 as desired.

Furthermore, each cord 28 includes a hook 32 that is intended to allow the cord 28 when stretched to attach to a bar 34 that is integrally formed within the second surface 24. This bar 34 preferably is comprised of metal and is in-mold mounted to the floor panel 20. However, it is understood that the bar 34 may be comprised of other suitable materials and may be integral parts of the reversible floorboard as desired. As a result, the cord 28 can be utilized for securing the item to the floor panel 20.

It is also understood that the bars 34 may be utilized for allowing fasteners of specialized cargo accessories to attach those components to the floor panel 20. These specialized cargo accessories and their fasteners are detailed in the description for FIG. 8.

Figure 6:
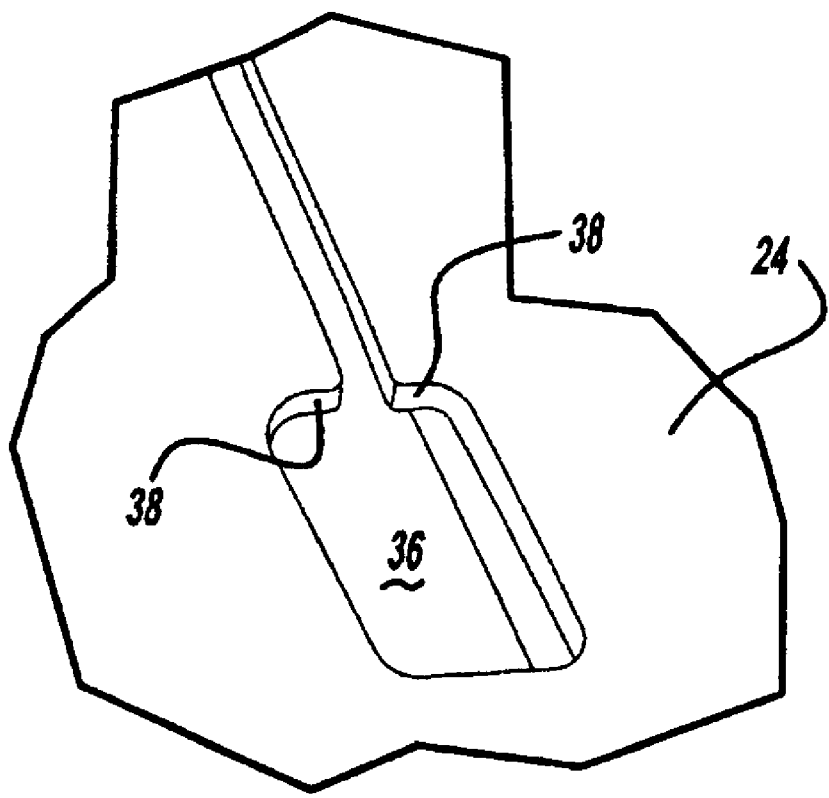
FIG. 6 is a magnified view of another exemplary mounting device shown in FIG. 4.

Referring now to FIGS. 4, and 6, other mounting devices integrated with the second surface 24 of the reversible floorboard include one or more tracking slots 36. These slots 36 are intended to receive the hooks 32 of the stretchable cords 28 or a variety of opposing male fasteners, e.g. rails, extending from specialized cargo accessories (as detailed in the description for FIG. 8).

Referring now to FIG. 6, each slot 36 is integrally formed within the floor panel 20 beneath the second surface 24. Specifically, the slot 36 is partially defined by opposing retention ledges 38 extending from the second surface 24 of the vehicular floor panel 20. These ledges 38 are aligned with the second surface 24 so as to provide the second surface 24 with a smooth, uninterrupted surface.

According to another embodiment, the retention ledges extend upward from the second surface 24 of the vehicular floor panel 20. These retention ledges are integral parts of an injection molded floor panel 20. However, it is understood that the retention ledges may instead comprise one or more pieces that are separate components from the floor panel 20 and are fixedly attached to the floor panel 20. Moreover, the slots 36 may have other suitable constructions as desired.

Figure 7:
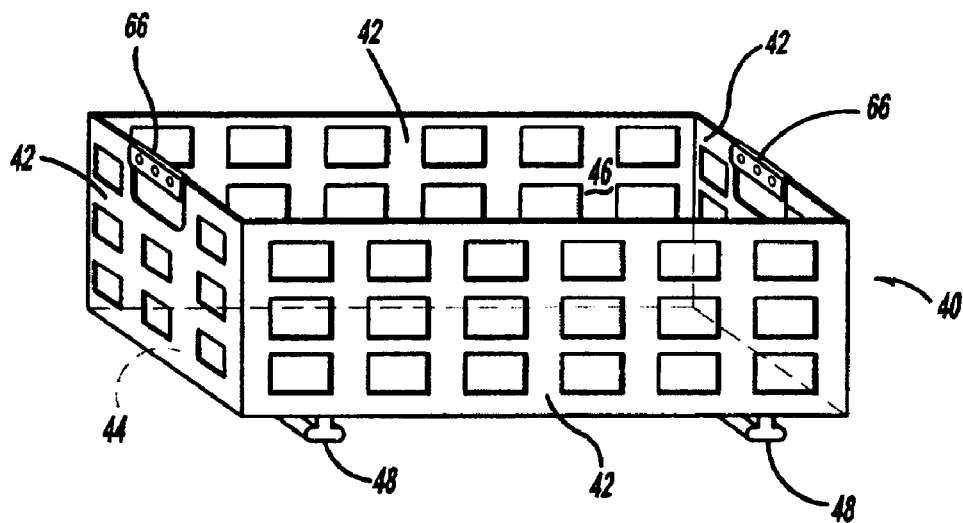
FIG. 7 is a top perspective view of a storage device for attachment to a vehicular floor panel, in accordance with one embodiment of the present invention.

Referring now to FIG. 7, there is shown a storage device 40 as an exemplary specialized cargo accessory for attachment to the second surface 24 of the vehicular panel 20. This storage device 40 includes four walls 42 adjoined together at their sides and a bottom plate 44 attached to the bottom of the walls. These walls 42 and the bottom plate 44 collectively define a receptacle 46 for containing various items and permitting convenient transport of those items. It is understood that this storage device 40 may have various other suitable constructions as desired. Additionally, this storage device 40 includes one or more handles 66 for allowing an individual to carry the storage device 40.

Figure 8:
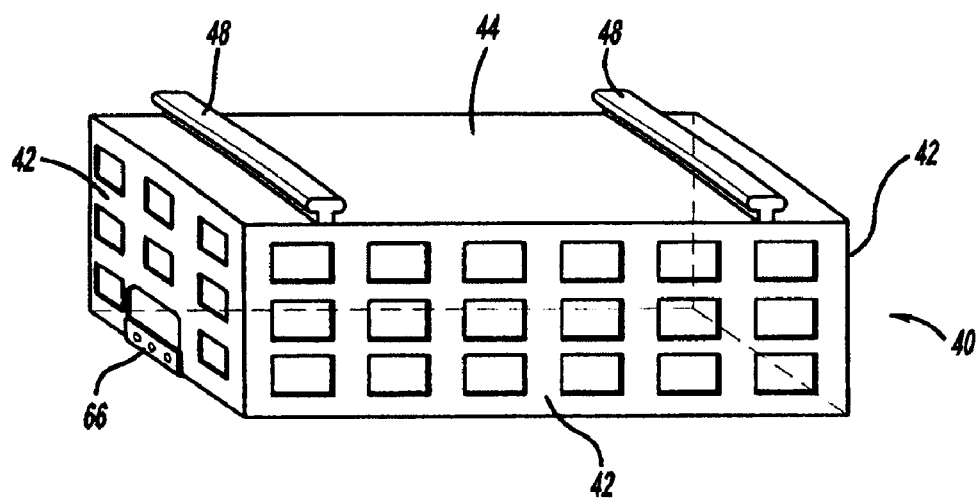
FIG. 8 is a bottom perspective view of a storage device having rails for attachment to the exemplary mounting device shown in FIG. 7.

As shown in FIG. 8, the bottom plate 44 of the storage device 40 includes two rails 48 extending downwardly therefrom. These rails 48 preferably are integral parts of an injection molded storage device. However, in an alternative embodiment, the rails 48 may instead be separate pieces that are attached to the bottom plate 44. Moreover, in yet another embodiment, the storage device 40 may have female fasteners extending downwardly therefrom as desired.

Figure 9:
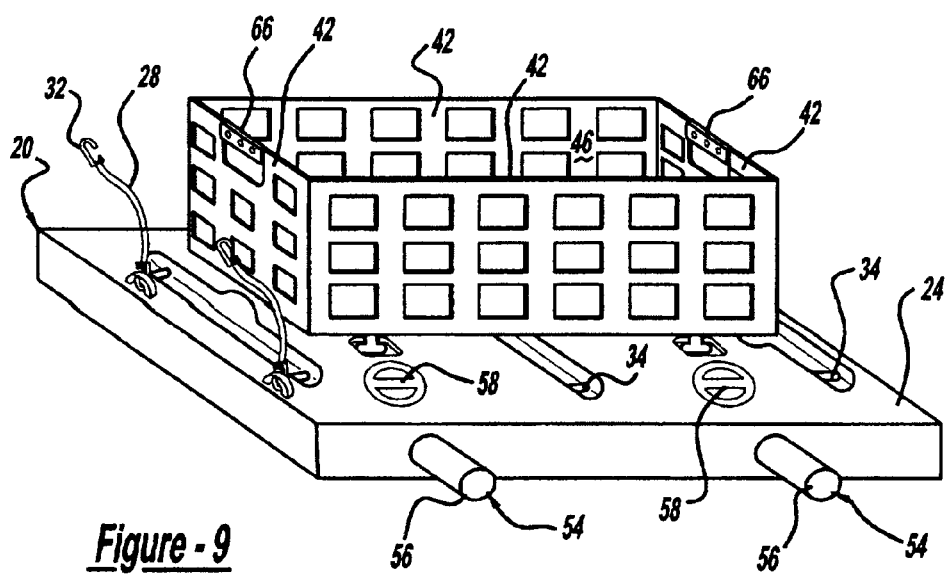
FIG. 9 is a perspective view illustrating attachment of the storage device shown in FIG. 8 to the second surface of the vehicular floor panel.
Figure 10:
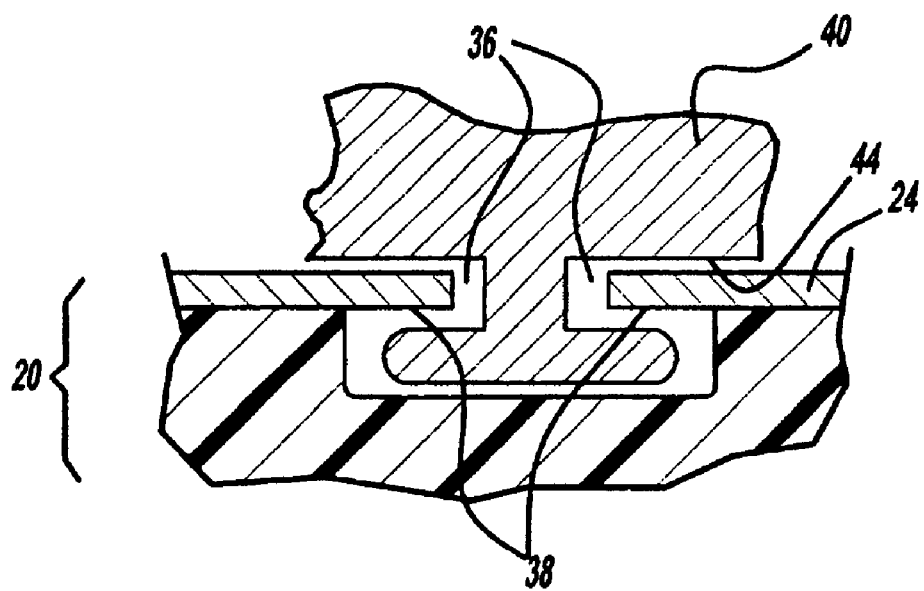
FIG. 10 is a cross-sectional view of the storage device mounted to the vehicular floor panel by way of the exemplary mounting device shown in FIG. 6.

As shown in FIGS. 9 and 10, the rails 48 are intended to be inserted into the tracking slots 36 formed within the second surface 24 of the vehicular floor panel 20. As a result, the opposing retention ledges 38 of the slot 36 secure the storage device 40 to the floor panel 20 in every direction except for along the longitudinal axis of the slot.

Figure 11:
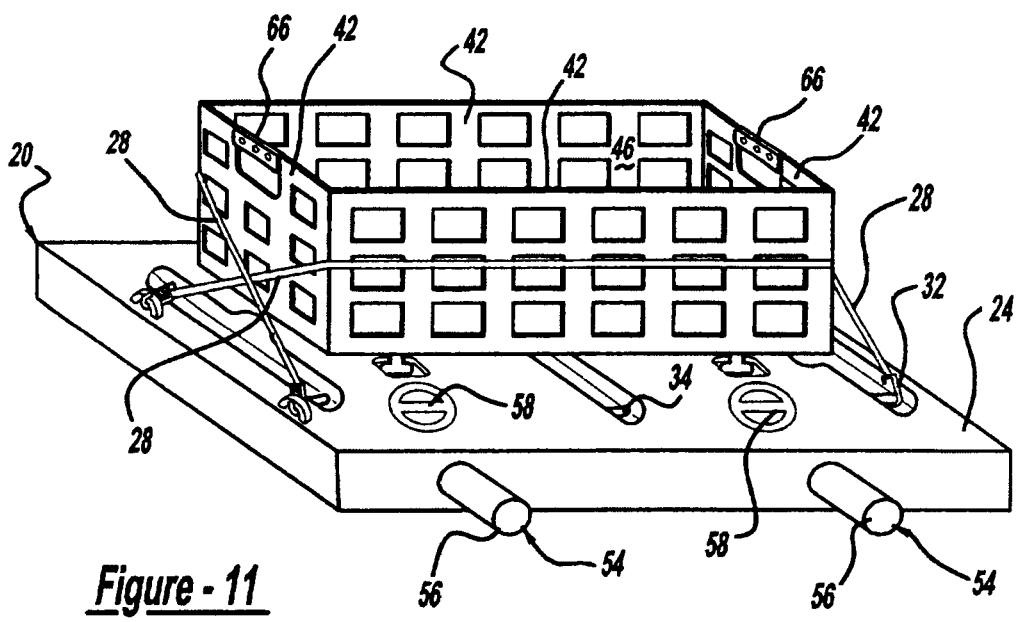
FIG. 11 is a perspective view of the storage device shown in FIG. 10 being secured in position at a point along the longitudinal axis of the exemplary mounting device.

In addition, as best shown in FIG. 11, the stretchable cords 28 can be wrapped around the storage device 40 for reducing or even preventing movement of the storage device 40 along the axis of the slots 36.

Referring now to FIGS. 12A–13C, the floor pan 16 and the vehicular floor panel 20 include attachment mechanisms for attaching the panel 20 to the floor pan 16 and selectively exposing either the first surface 22 or the second surface 24 to the passenger cabin.

Specifically, the floor pan 16 includes one or more openings 50, 50" on opposing sides of the recess 18. These openings 50, 50" are intended to receive male fasteners extending from the vehicular floor panel 20 for the purpose of securing the floor panel 20 to the floor pan 16. However, it is understood that the floor pan 16 may instead include the male fasteners for attachment to female fasteners formed in the floor panel 20. In addition, although three openings 50, 50" are shown in FIG. 1, it is understood that less or more than three openings 50, 50" can be utilized in any combination thereof as desired.

Figure 12A:
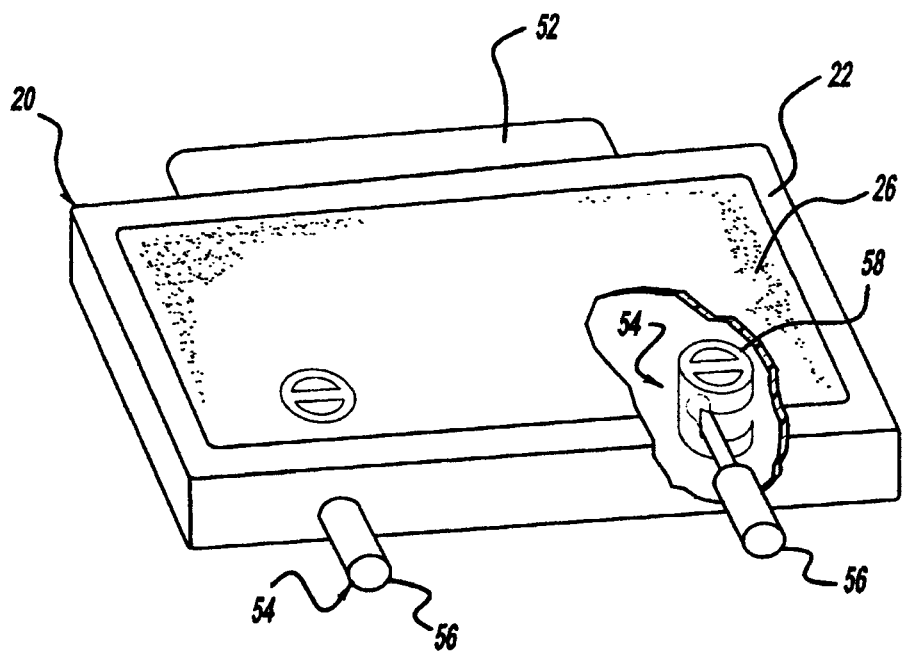
FIG. 12A is a partially cutaway view of the vehicular floor panel shown in FIG. 1, with a pair of cam latch mechanisms.
Figure 12B:
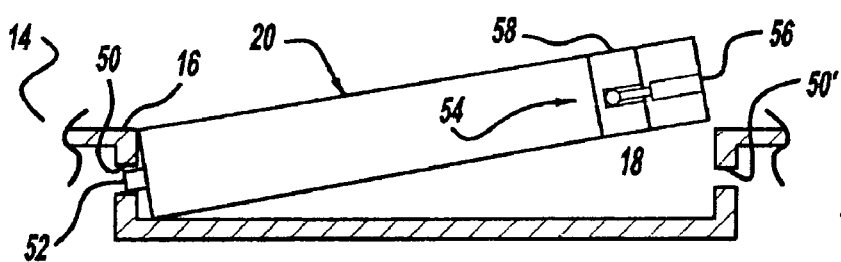
FIG. 12B is a cross-sectional view of the vehicular floor panel shown in FIG. 12A, illustrating attachment of the vehicular floor panel to a floor pan.

Referring now to FIGS. 12A–12C, there are shown exemplary male fasteners extending from the vehicular floor panel 20 according to one embodiment of the present invention. These fasteners include one or more fixed tabs 52 extending from a first side of the panel 20 and one or more cam latch mechanisms 54 extending from a second side of the panel 20 that is opposite to the first side of the panel 20.

Each cam latch mechanism 54 includes a retractable tab 56 that can be selectively retracted into and extended from the panel 20 by rotating a knob 58. However, various other suitable latch mechanisms may be utilized as exemplified in the description for FIGS. 13A–13C.

As shown in FIG. 12B, attaching the vehicular floor panel 20 to the floor pan 16 initially requires that the first side of the panel 20 is placed within the recess 18 of the floor pan 16 and that the fixed tab 52 of the floor panel 20 is inserted into the opening 50 formed within the floor pan 16. Also, the cam latch mechanisms 54 are retracted inward so as to place the retractable tabs 56 within the panel 20. Then, the second side is lowered into the recess 18 thereby placing the entire panel 20 within the recess 18. Thereafter, as shown in FIG. 12C, a user may turn the knobs 58 of each cam latch mechanism 54 and extend the retractable tabs 56 into the openings 50" in the floor pan 16 so as to secure the panel 20 to the floor pan 16.

Figure 13A:
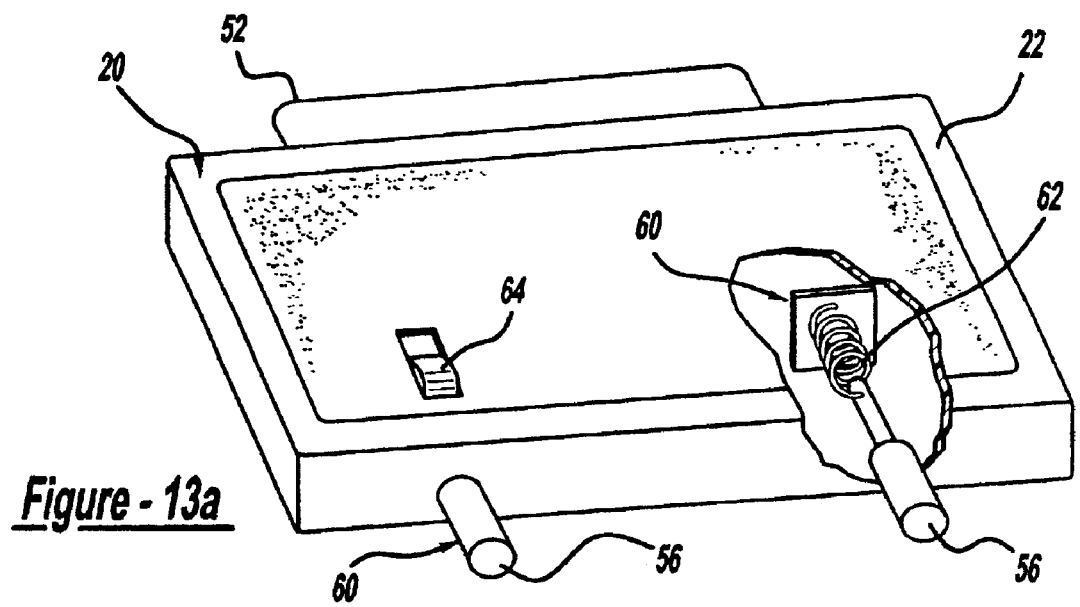
FIG. 13A is a partially cutaway view of the vehicular floor panel shown in FIG. 1, with a pair of spring-loaded latch mechanisms, in accordance with another embodiment of the present invention.
Figure 13B:
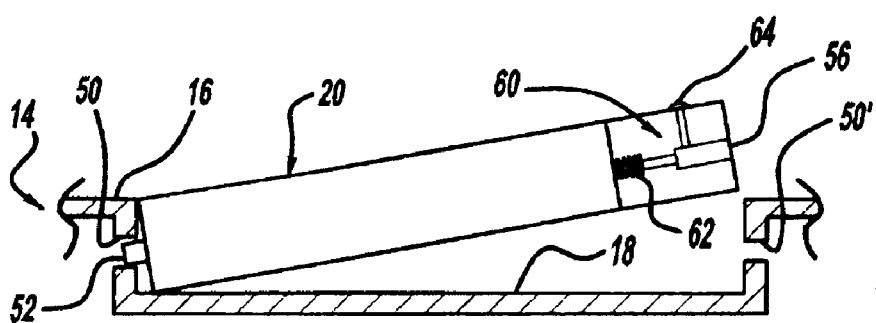
FIG. 13B is a cross-sectional view of the vehicular floor panel shown in FIG. 13A, illustrating attachment of the vehicular floor panel to a floor pan.
Figure 13C:
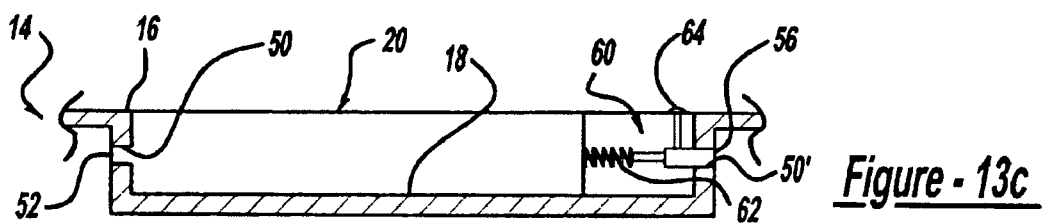
FIG. 13C is a cross-sectional view of the vehicular floor panel shown in FIG. 13B, illustrating the spring-loaded latch mechanisms securing the vehicular floor panel to the floor pan.

Referring now to FIGS. 13A–13C, the vehicular floor panel 20 may utilize a spring-loaded latch mechanism 60 according to another embodiment of the invention. The spring-loaded latch mechanism 60 includes a retractable tab 56 and a spring 62 for biasing the retractable tab 56 outward from the vehicular floor panel 20. The retractable tab 56 also includes a retractor arm 64 for allowing an individual to force the tab 56 to retract into the floor panel 20.

This floor panel 20 may be secured to the floor pan 16 by first inserting the rigid fixed tab 52 on the first side of the floor panel 20 into the opening 50 of the floor pan 16. In addition, as shown in FIG. 13B, the spring-loaded latch mechanisms 60 are retracted into the second side of the floor panel 20. Thereafter, the second side of the floor panel 20 is lowered into the recess 18 so as to place the entire floor panel 20 within the recess 18. Then, the user releases the spring-loaded latch mechanisms 60 and allows the springs 62 to force the retractable tabs 56 into the openings 50" of the floor pan 16.

While particular embodiments of the invention have been shown and described, numerous variations and alternate embodiments will occur to those skilled in the art. Accordingly, it is intended that the invention be limited only in terms of the appended claims.

what is claimed is:

1. A flooring assembly for an automotive vehicle comprising:

a floor pan fixedly attached to the automotive vehicle, said floor pan having a recess integrally formed therein as defined by a lower base plate; and a reversible floorboard selectively coupled to said floor pan within said recess, said reversible floorboard having a first surface with a fabric covering attached thereon and a second surface with at least one mounting device integrated thereon, said at least one mounting device for securing an item to said reversible floorboard, said reversible floor board being supported substantially across at least one of said first surface and said second surface by said lower base plate of said floor pan;

wherein said reversible floorboard allows access to one of said first surface and said second surface from within the automotive vehicle;

wherein said at least one mounting device is at least one of a slot, a bar, and a stretchable cord integrated within said second surface of said reversible floorboard.

2. The flooring assembly of claim 1 wherein said floor pan includes at least two openings formed therein adjacent to said recess.

3. The flooring assembly of claim 2 wherein said reversible floorboard includes at least one fixed tab and latch fastening pair for insertion into said at least two openings and selectively coupling said reversible floorboard to said floor pan.

4. The flooring assembly of claim 3 wherein said at least one fixed tab and latch fastening pair comprises:

at least one fixed tab extending from a first side of said reversible floorboard; and at least one cam latch mechanism integrally formed in an opposing second side of said reversible floorboard, said at least one fixed tab and said at least one cam latch mechanism intended to be inserted into said at least two openings formed within said floor pan so as to selectively couple said reversible floorboard to said floor pan.

5. The flooring assembly of claim 3 wherein said at least one fixed tab and latch fastening pair comprises:

at least one fixed tab extending from a first side of said reversible floorboard; and at least one resilient latch mechanism integrally formed within an opposing second side of said reversible floorboard, said at least one fixed tab and said at least one resilient latch mechanism intended to be inserted into said at least two openings formed within said floor pan so as to selectively couple said reversible floorboard to said floor pan.

6. The flooring assembly of claim 1 wherein said fabric covering is a carpeting material.

7. The flooring assembly of claim 1 wherein said reversible floorboard is comprised of an injection molded material.

8. The flooring assembly of claim 1 further comprising:

a specialized cargo accessory for attachment to said second side of said reversible floorboard.

\* \* \* \* \*